United States Patent [19]

Sonderegger et al.

[11] Patent Number: 5,179,857
[45] Date of Patent: Jan. 19, 1993

[54] MONITORING SYSTEM FOR CYCLICALLY OPERATING MACHINES

[75] Inventors: Hans Sonderegger, Neftenbach; Rolf Kuratle, Winterthur; Peter Wolfer, Kleinandelfingen, all of Switzerland

[73] Assignee: Kistler Instrumente AG, Switzerland

[21] Appl. No.: 709,026

[22] Filed: May 31, 1991

[51] Int. Cl.⁵ .......................................... G01M 15/00
[52] U.S. Cl. .................................................. 73/117.3
[58] Field of Search ........................ 73/115, 116, 117.3, 73/119 R, 120, 119 A, 802.68

[56] References Cited

U.S. PATENT DOCUMENTS

| | | |
|---|---|---|
| 2,919,576 | 1/1960 | Weller, Jr. et al. ...................... 73/115 |
| 3,210,993 | 10/1965 | Shoor et al. .......................... 73/862.68 |
| 3,393,557 | 7/1968 | Brown et al. ............................ 73/116 |
| 4,215,404 | 7/1980 | Bukhtiyarov et al. ............... 73/117.3 |
| 4,252,013 | 2/1981 | Hyanova et al. .................... 73/117.3 |
| 4,424,709 | 1/1984 | Meier, Jr. et al. .................. 73/117.3 |
| 4,446,724 | 5/1984 | Focht ...................................... 73/116 |
| 4,761,993 | 8/1988 | Klepacki .............................. 73/115 |

FOREIGN PATENT DOCUMENTS

| | | | |
|---|---|---|---|
| 0084538 | 4/1986 | Japan ...................................... 73/115 |
| 1-55229 | 6/1989 | Japan ................................. 73/119 R |
| 1432359 | 10/1988 | U.S.S.R. ............................. 73/117.3 |

Primary Examiner—Robert Raevis
Attorney, Agent, or Firm—Barnes & Thornburg

[57] ABSTRACT

Monitoring systems for cyclically operating machines having a cylinder including sensor to be mounted on the exterior of said cylinder for detecting both force in said cylinder and structure-borne signals in the cylinder; and having a computer for storing pre-recorded force and structure-borne noise signal as a function of time in a cycle and for comparing said detected and pre-recorded force and structure-borne noise signals to determine the status of said machine. The sensor has the form of a thin disk fitted between a cylinder cover and a nut of a cylinder cover stud under preload, thus replacing the standard washer.

12 Claims, 5 Drawing Sheets

MONITORING SYSTEM FOR CYCLICALLY OPERATING MACHINES

BACKGROUND AND SUMMARY OF THE INVENTION

Many attempts have been made to measure the cylinder pressure directly in the cylinder, using piezoelectric and strain gauge sensors. Due to carbonization and corrosion influences, however, it has not been possible to design a dependable sensor capable of functioning inside the combustion chamber and with the necessary accuracy for the required operating period of 4000 to 8000 hours. Consequently, monitoring systems have been devised with pressure sensors outside the combustion chamber, typically on the indicator connection still provided on every diesel engine today. The sensor is then connected to the cylinder from time to time by a manually or automatically operated valve. This intermittent monitoring system is unable to detect phenomena occurring suddenly and briefly, which may be important under certain circumstances. Consequently it has not been adopted widely.

Indirectly measuring cylinder pressure measuring systems have appeared recently, based on the strain of cylinder studs or cylinder force conducting parts. Piezoelectric load washers under the nuts of cylinder cover studs were employed as long as 20 years ago for research purposes and have yielded cylinder pressure curves of very high information value. However, such washers were too high and too costly for a monitoring system. On account of their height, they would require special fitting procedures. The same is true of measuring washers fitted with strain gauge elements, which are also not suitable for continuous operation.

The object of the invention is to create an informative monitoring system for engines, compressors and other cyclically operating machines, which is suitable for continuous operation and easy to install and remove.

The object is achieved by sensors of the system detecting both the force versus pressure curve in each cylinder and the structure-borne noise signals, and comparing the detected values with prestored values in a computer, to analyze the engine state. The present state can thus be compared continuously with the state when new.

A principal feature of the invention is the use of the equivalent variable cylinder force in place of the cylinder pressure. This force provides a pattern fully correlated to the cylinder pressure throughout the running time of the plant or engine, regardless of local carbonization. By recording the nominal force curves for all cylinders under a number of load states, in new condition and after plant overhaul, and storing these curves in a computer, an elegant and reliable comparison possibility is obtained between the particular actual state and the nominal state, without having to know the absolute magnitude of the cylinder pressure. This provides a monitoring method that is not rendered uncertain by erroneous indication procedures and functions irreproachably over the required running time of 4000 to 8000 service hours.

According to the invention, a selected cylinder cover stud of each cylinder cover is equipped with a thin disk sensor, which replaces the standard washer of the same overall height. The nut is then tightened with normal torque. Accordingly, fitting these monitoring sensors is very simple and requires no reworking.

The elasticity behavior of the screw connection is unchanged, because the thin disk sensor consists mainly of steel.

It is important that a cylinder cover stud as far away as possible from the neighboring cylinders should be equipped with a sensor, in order to minimize interferences.

The cylinder force measurement is related directly with the pressure measurement in the cylinder by comparative measurement of the cylinder pressure measured on the indicator connection. For this, the signal measured in the pressure sensor is compared from time to time, especially after any engine overhaul, by a simple calibration procedure with the cylinder pressure.

For the monitoring function, however, the cylinder force diagram is quite sufficient as relative pressure diagram, because it reproduces all details of the cylinder pressure diagram.

Only the relative change in time of the engine state during the service period of 4000 to 8000 hours is of importance for monitoring. Also important is that every cylinder should be monitored.

Equally important is a TDC mark of reliable accuracy, fed into the data acquisition system. It is advantageous to make this mark on the flywheel, related to the cylinder nearest to this. It is evaluated for this cylinder only.

ENGINE AND MACHINE NOISE ANALYSIS

A frequency range of 0.1 to 2 kHz is used to monitor the force curve. Only in special cases are higher ranges up to 4 kHz needed. Engine noises such as valves knocking, etc., which reach the sensors as structure-borne noise, are usually registered a interference. Since the frequency ranges of structure-borne noise usually lie between 3 and 10 kHz, such interference can be mostly filtered out.

In research pressure metrology of combustion processes, the transmission of structure-borne noise is a nuisance to be eliminated by filtering technique. According to the present invention, the transmission of this noise is exploited as an important and additional aid to monitoring the plant.

Structure-borne noise is usually measured with accelerometers, though pressure and force transducers are partially sensitive to it. According to the invention, however, an accelerometer optimized for structure-borne noise is combined with the force transformer to constitute one unit, enabling both measuring parameters:
cylinder pressure/force and
structure-borne noise
to be evaluated with one assembly unit and one connecting cable. With suitable filter technique, the two parameters can be separated, even if they are connected to the filter/amplifier arrangement with the same measuring line.

According to the invention, the same thin disk sensor elements include both dynamometry and accelerometry and transmits their signals in separate lines by the same cable.

The thin disk sensor ensures full coupling to structure-borne noises. By virtue of its fitting under the nuts of the cylinder cover studs, a perfect connection zone to the cylinder cover surface results, without-air gap, so that loss-free introduction of structure-borne noise from both cylinder cover and cylinder is assured.

It is thus possible to monitor the opening and closing times of injection valves as well as inlet and outlet valves. Piston seizures too are detectable in the incipient stage, because they set up a characteristic chattering noise in the upper frequency range.

It will accordingly be evident that the essence of the invention is the detection of the cylinder pressure, force and engine noise at a single measuring point, which is ideal for dynamometry as well as for perfect coupling to the structure-borne cylinder noise.

For the first time, it is therefore possible to build a universal monitoring system affording continuous insight into the complex functions of a machine installation.

Other objects, advantages and novel features of the present invention will become apparent from the following detailed description of the invention when considered in conjunction with the accompanying drawings.

DETAILED DESCRIPTION OF THE DRAWINGS

Figure 1:
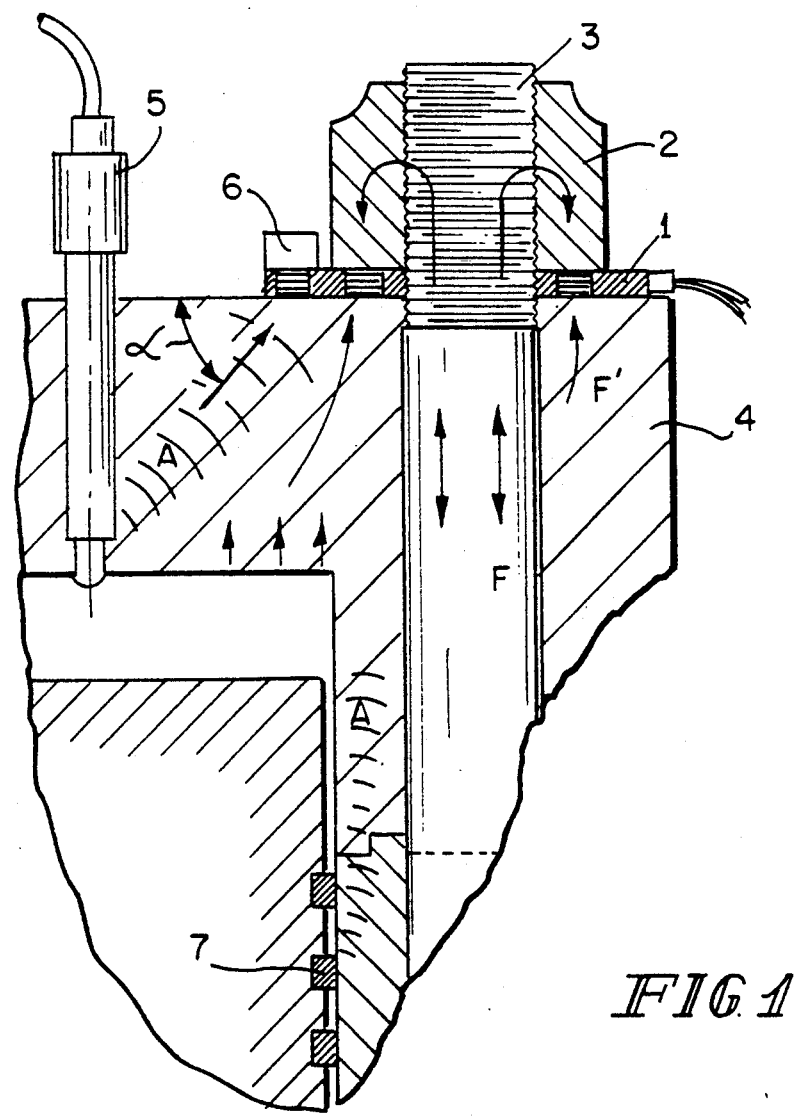
FIG. 1 is a partial cross-sectional view through cylinder cover with stud and fitted thin disk sensor according to the principles of the present invention.

A cylinder cover of a diesel engine is shown in FIG. 1. A thin disk sensor 1 is fitted between nut 2 and cylinder cover 4 and placed under high preload to obtain perfect mechanical connection with the cylinder cover. This ensures that structure-borne noise A, typically from the injection nozzle 5 or seizing piston rings 7 (carbonized rings without lubrication), enters the accelerometer 6 of the thin disk sensor 1 which measures the structure-borne noise without loss. A cylinder cover stud 3 holds the cylinder cover 4 against the engine block, not shown, with the force F. This force F also acts on the thin disk sensor 1 and is increased by the force F' (indicated by the arrow), which acts additionally as a result of the cylinder pressure. The concentric arcs 'A' denotes the structure-borne noise waves measured by the accelerometer 6, which enter the transducer surface at the angle 'α'.

Figure 2:
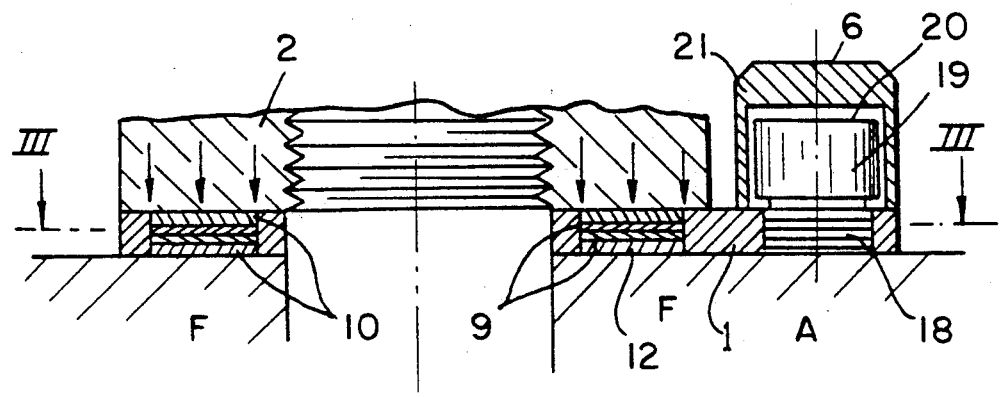
FIG. 2 is a cross-sectional view through a first embodiment of thin disk sensor of FIG. 3 along lines II—II.
Figure 3:
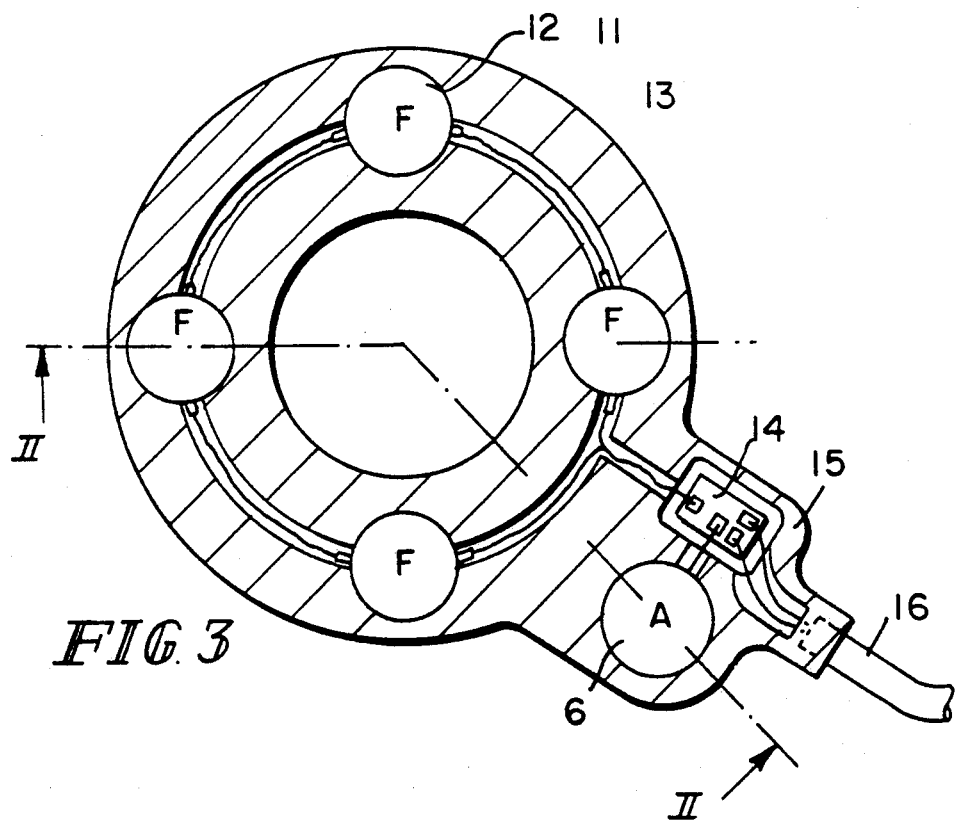
FIG. 3 is a cross-sectional view of a thin disk sensor as FIG. 2 along lines III—III.
Figure 4:
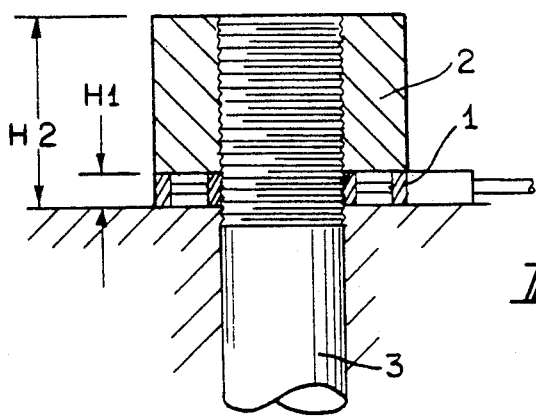
FIG. 4 is a cylinder cover stud with thin disk sensor fitted.

The thin disk sensor 1 according to the invention is illustrated in FIG. 2 and FIG. 3 shows the top. The thin disk sensor consists of a thin flat disk 11 having openings in which a number of force measuring elements 12 are fitted. These are assembled advantageously from a stack of piezoelectric disks 9 between top and bottom plates 10.

On account of its height, the accelerometer 6 is arranged in the disk 11 outside the nut 2. The force measuring elements 12 are connected with a preamplifier 14 via a signal lead 13 in the disk 11. The accelerometer 6, located outside the nut 2, may be integrated, for example, in the connection housing 14, and has signal leads likewise connected to the preamplifier 14. A cable 16 is connected to the outputs of the preamplifier 14.

The accelerometer 6 consists of the piezo-array 18, seismic mass 19, spring 20 and accelerometer housing 21. It can be sensitive in one or more axes as is well known in the accelerometer art.

Shown in FIGS. 4, 5, 6 and 7 are accelerometers of very flat design which can also be arranged under the nut 2. They include for example bender accelerometers which have found widespread use under the trade name "Piezobeam" and are described in the technical literature.

Other very flat accelerometers may be used also, however, such as silicon chip accelerometers based on piezoresistance or capacitance, although until now, only piezoelectric accelerometers have been used in continuous operation. Very flat accelerometers can be made with piezoelectric films too.

FIG. 4 shows, once again, the relative sizes of thin disk sensor 1, nut 2 and cylinder cover stud 3. The height H1 of the thin disk sensor 1 amounts to not more than one-sixth of the height H2 of the nut. This has emerged as a guideline for ensuring that the nut 2 with the standard cylinder cover stud 3 can still be fully loaded after fitting the thin disk sensor 1. It is an advantage if the thin disk sensor 1 can replace a standard washer and has a height H1 in the range of six to eight millimeters.

Figure 5:
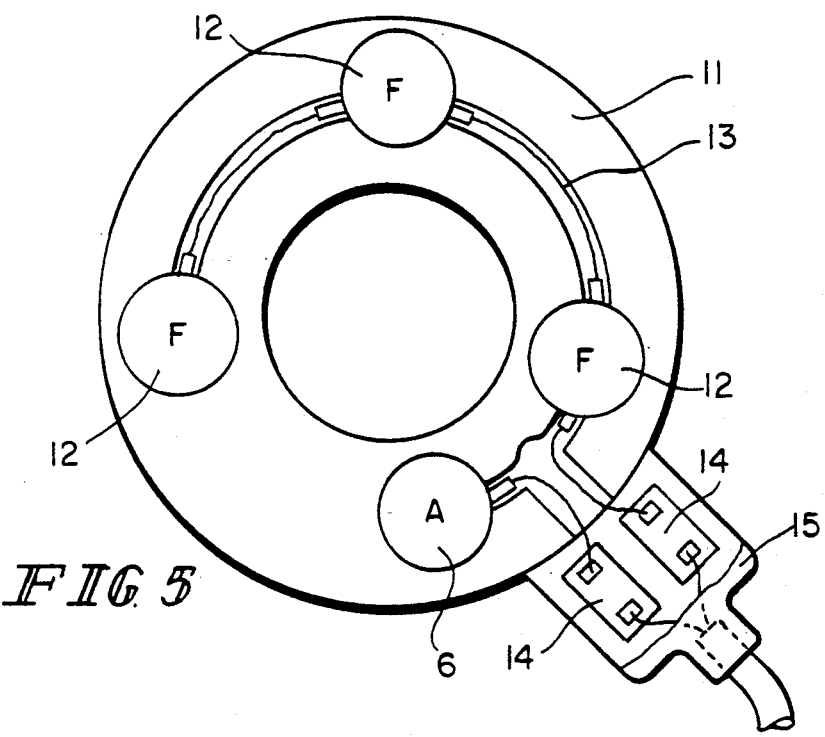
FIG. 5 is a plan view of the thin disk sensor of FIG. 4.

FIG. 5 shows a thin disk sensor 1 having all sensors accommodated in the perforated flat disk 11. As mentioned, this is possible only with flat accelerometers. The signals from the sensors pass to two separate preamplifiers 14. Three force measuring elements 12 are connected in mechanical force measuring parallel to one of the amplifiers 14 and an accelerometer 6 is connected to another amplifier 14. Alternatively, a single amplifier may be used as in FIG. 3.

Figure 6:
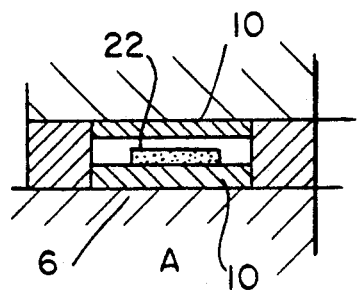
FIG. 6 is a cross-section of another embodiment of an accelerometer as FIG. 5.

FIGS. 6–9 show additional embodiments of accelerometers and force measuring elements to be used with disk 11 of FIG. 5. FIG. 6 shown an accelerometer 6 consisting of the top and bottom plate array 10 and a silicon accelerometer chip 22.

The silicon element 22 has a very small seismic mass and is therefore very flat.

Figure 7:
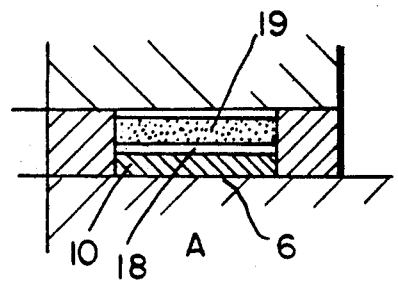
FIG. 7 is a cross-section of a further embodiment of an accelerometer as FIG. 5.

FIG. 7 shows a very flat piezoelectric accelerometer 6 consisting of piezoelectric disk 18 (e.g. film) and seismic mass 19.

Figure 8:
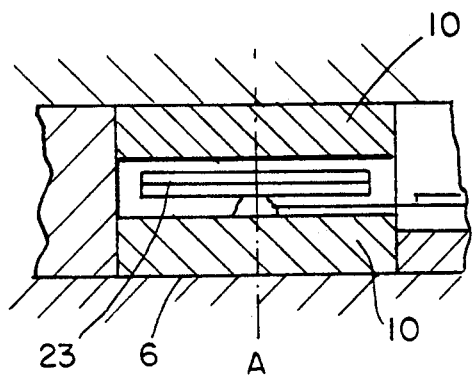
FIG. 8 is a cross-section of even a further embodiment of an accelerometer as FIG. 5.

FIG. 8 shows a bender accelerometer as mentioned above, consisting of the top and bottom plate array 10 and the bender element 23. This is a bimorph ceramic piezo-beam, supported in the middle and highly sensitive to structure-borne noise. Its output signal is much simpler than that of a silicon accelerometer, making a piezo-accelerometer more reliable.

Figure 9:
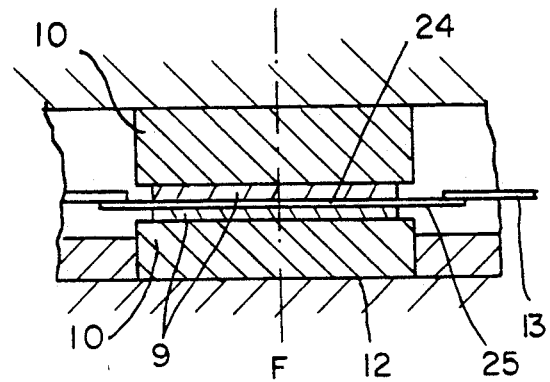
FIG. 9 is a cross-section of a further embodiment of a force measuring element as FIG. 5.

FIG. 9 shows a variant of a force measuring element 12 having an electrode 24 between two piezoelectric disks 9. The electrode 24, stamped from film, has connecting terminals 25 to which the signal leads 13 are soldered or welded. By using piezo-elements for measuring force and structure-borne noise, simple and reliable internal signal lines result, which are crucially important for the long-time vibration loads required.

Figure 10:
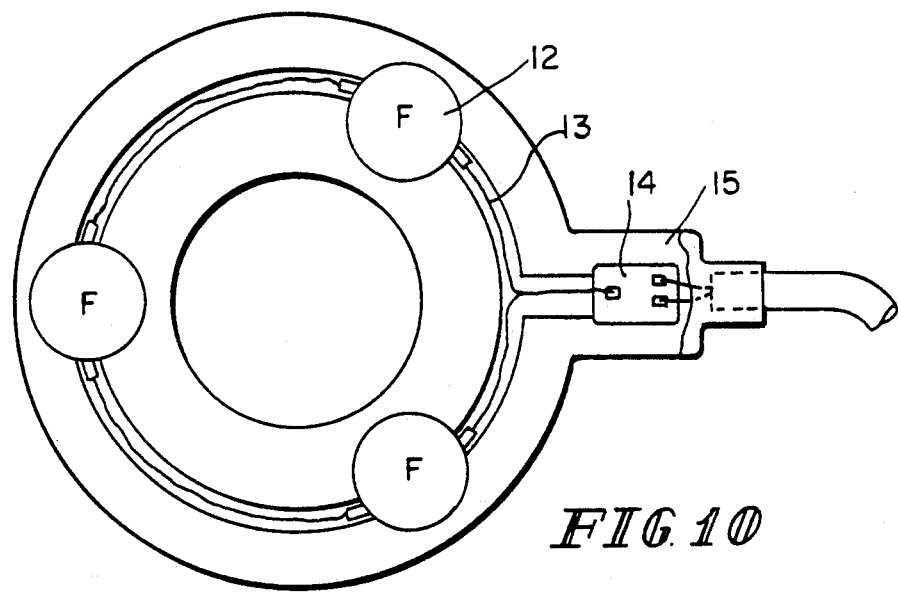
FIG. 10 is a plan view onto a thin disk sensor with only force measuring elements.

FIG. 10 shows a simplified form of a thin disk sensor 1 containing only force measuring elements 12. As mentioned above, force measuring elements also pick up structure-borne noise signals which are then overlaid on the force measuring signal. Both signals can be detected by suitable filter arrangements.

Figure 11:
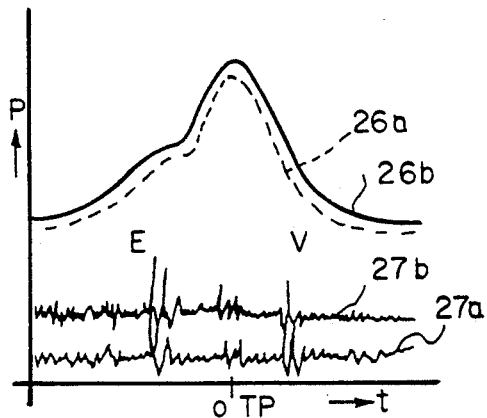
FIG. 11 is a diagram with two separate measuring channel graphs of force/pressure and structure-borne noise versus time.

FIG. 11 shows a force/pressure, structure-borne noise v. time diagram recorded with an arrangement according to FIG. 5. The actual force/pressure signal 26b and the structure-borne noise signal 27b are evaluated separately. An original force/pressure signal 26a and structure-borne noise signal 27a are recorded, in a computer for example, after an engine overhaul (setpoint) and can be compared at any time with the present actual values 26b, and 27b, providing the engineer or the monitoring software with standards for assessment. Point E shows the up/down stroke of the injection valve. Point V indicates the outlet valve opening. This yields important additional information for the force/pressure signal.

Figure 12:
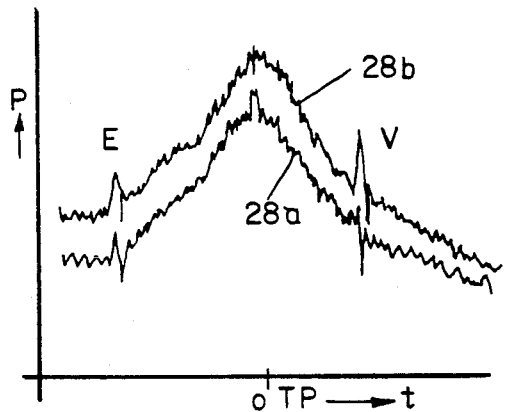
FIG. 12 is a diagram with two signals on the same channel graphs of force/pressure and structure-borne noise versus time.

FIG. 12 shows a force/pressure, structure-borne noise v. time diagram recorded with an arrangement according to FIG. 10. Force/pressure and structure-borne noise signals are superposed in signal 28b and can be made more recognizable by filtering. Only a limited assessment is possible with it however. Signal 28a is the pre-recorded reference signal.

Figure 13:
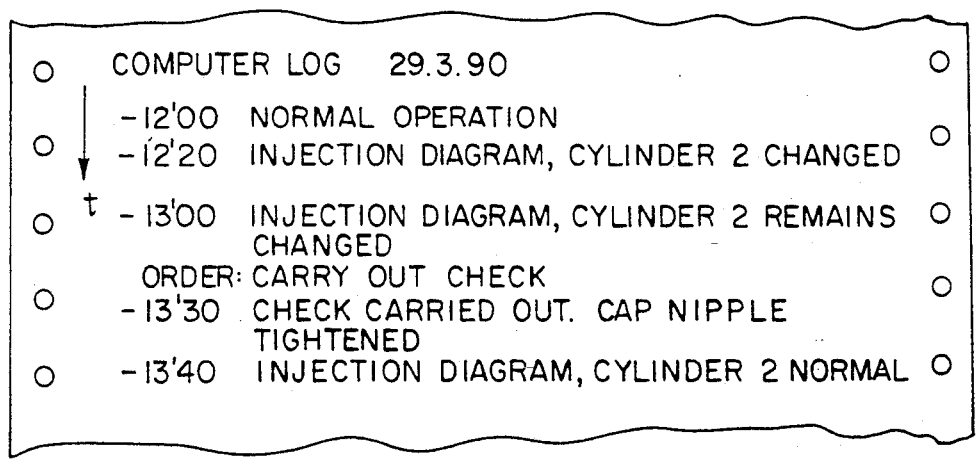
FIG. 13 is a typical computer printout report.

FIG. 13 is an example of signal processing as it appears in the computer printout with suitable software. The signals of the two measured values are analyzed continuously and translated by the software into appropriate commands, enabling minor repairs to be performed during operation and in good time. Whether they were actually performed and with what result is verified and logged continuously.

Figure 14:
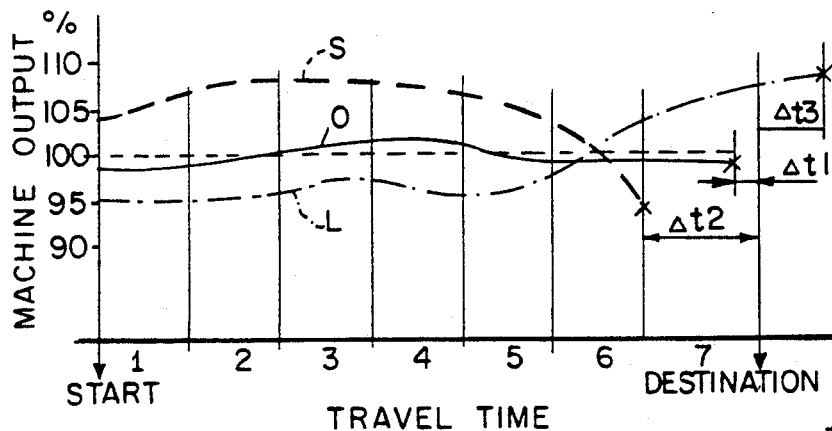
FIG. 14 is a typical voyage monitoring chart of engine output versus travel time.

FIG. 14 shows a typical voyage monitoring chart, recording the travel time in days versus percentage of the actual output of the sensors compared to the pre-recorded output of the sensor of the engine output.

Curve O represents optimal operation of the ship with a destination error Δt1 (arrival at destination about 5 hours too early). The captain following curve S wanted to arrive as soon as possible or Δt2 of 24 hours early to gain time for recreation in port. The captain on curve L was out to save as much power as possible during the first part of the voyage, with the result that he arrived more than 12 hours late, Δt3, despite running at overload during the last two days.

The monitoring system shown thus provides exceptionally important information for the shipowners and those running the vessel, enabling new economy limits to be attained above all through planned short-term and long-term maintenance and optimal engine output. Accordingly, the system pays for itself very quickly.

As mentioned previously, the arrangement according to the invention concerns not only marine propulsion. All major installations on drilling platforms, pumping stations for long-distance gas pipelines, stationary power generating and heat recovery plants, can be monitored in this way. Injection molding machines and presses can be monitored, i.e., all machines operating cyclically.

By employing standardized force measuring elements 12 and accelerometers 6, the thin disk sensors according to the invention can be adapted in simple manner to the dimensions of the user's plant. As application progresses, a variety of thin disk sensors will be developed.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Monitoring systems for cyclically operating machines having a cylinder comprising:
    at least one sensor means mounted at a single measuring point on the exterior of said cylinder and including a force sensor for detecting force in said cylinder which is indicative of the pressure in said cylinder and an acceleration sensor for detecting structure-borne noise in said cylinder; and
    computer means for storing pre-recorded force and structure-borne noise as a function of time in a cycle of said cylinder as a reference and for comparing said detected force and structure-borne noise and reference force and structure-borne noise to determine the status of said machine.

2. Monitoring system according to claim 1, wherein said sensors are from the group of piezoresistive, capacitive, strain gauge and thin film sensors.

3. Monitoring system according to claim 1, wherein said sensor means has the form of a thin disk fitted between a cylinder cover and a nut of a cylinder cover stud under preload, said disk having the thickness of a standard washer.

4. Monitoring system according to claim 1, wherein said sensor means comprises thin disk sensor consisting of a flat disk having at least one opening into which at least one measuring element is recessed.

5. Monitoring system according to claim 4 including a plurality of openings and a plurality of force measuring elements and an accelerometer.

6. Monitoring system according to claim 5, wherein said measuring elements which measure force are piezoelectric connected in series electrically, but connected in parallel force wise to the flat disk so that each measures only one part of the total force acting on the thin disk sensor.

7. Monitoring system according to claim 4 including preamplifiers in a unitary connecting part of said flat disk.

8. Monitoring system according to claim 1, wherein the acceleration sensor is piezoelectric and is sensitive in one or more axes.

9. Monitoring system according to claim 1, wherein said computer means includes means for generating an output of information for rectifying troubles based on the detected structure-borne noise.

10. Monitoring system according to claim 1 wherein said computer means stores pre-recorded optimal engine performance as a function of structure-borne noise and compares continuously with detected structure-borne noise so that deviations can be graphed on an operation diagram.

11. A method of monitoring the operating state of a cyclically operating machine having a cylinder comprising:

sensing at a single measuring point on the exterior of the cylinder both force in said cylinder which is indicative of the pressure in said cylinder and structure-borne noise in said cylinder;

storing said sensed force and noise as a function of time as a reference;

subsequently sensing at said single measuring point on the exterior of the cylinder both force and structure-borne noise in said cylinder and comparing said subsequently sensed force and noise with said reference force and noise as a function of time in a cycle of said cylinder to determine the operating status of said machine.

12. Monitoring systems for cyclically operating machines having a cylinder comprising:

at least one sensor means mounted at a single measuring point on the exterior of said cylinder and including a force sensor for detecting both force in said cylinder which is indicative to the pressure in said cylinder and structure-borne noise in said cylinder;

electronic means for separating the detected cylinder force and the structure-borne noise; and computer means for storing separately pre-recorded force and structure-borne noise as a function of time in a cycle of said cylinder as a reference and for comparing said separated detected force and structure-borne noise and reference force and structure-borne noise to determine the status of said machine.

* * * * *